US009669718B2

(12) United States Patent
Oi et al.

(10) Patent No.: US 9,669,718 B2
(45) Date of Patent: Jun. 6, 2017

(54) POWER SUPPLY SYSTEM

(71) Applicant: TOYOTA JIDOSHA KABUSHIKI KAISHA, Toyota-shi, Aichi-ken (JP)

(72) Inventors: Shohei Oi, Toyota (JP); Ryoji Sato, Toyohashi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/875,798

(22) Filed: Oct. 6, 2015

(65) Prior Publication Data

US 2016/0101702 A1    Apr. 14, 2016

(30) Foreign Application Priority Data

Oct. 10, 2014    (JP) ................................. 2014-209057

(51) Int. Cl.
| H02M 7/44 | (2006.01) |
| H02J 1/00 | (2006.01) |
| B60L 11/18 | (2006.01) |
| H02M 3/158 | (2006.01) |
| H02J 7/00 | (2006.01) |

(52) U.S. Cl.
CPC ....... B60L 11/1803 (2013.01); B60L 11/1872 (2013.01); H02M 3/158 (2013.01); H02J 7/0065 (2013.01); H02M 2003/1586 (2013.01)

(58) Field of Classification Search
CPC ... H02J 1/1021; H02J 1/12; H02J 3/38; Y10T 307/707; B60L 11/1803; H02M 3/04; H02M 7/44

USPC .......................................................... 307/82
See application file for complete search history.

(56) References Cited

U.S. PATENT DOCUMENTS

| 2009/0066277 A1 | 3/2009 | Ang et al. |
| 2010/0001583 A1* | 1/2010 | Ichikawa ............. B60L 3/0046 307/10.1 |

FOREIGN PATENT DOCUMENTS

| JP | 2008-5625 | 1/2008 |
| NL | WO2011122946 | * 10/2011 |

* cited by examiner

*Primary Examiner* — Rexford Barnie
*Assistant Examiner* — Toan Vu
(74) *Attorney, Agent, or Firm* — Finnegan, Henderson, Farabow, Garrett & Dunner, LLP (57) ABSTRACT

A power supply system includes: a first voltage converter configured to bidirectionally convert voltage between a first battery and an output line in accordance with first pulse width modulation control; a second voltage converter connected to the output line in parallel with the first voltage converter, the second voltage converter being configured to bidirectionally convert voltage between a second battery and the output line in accordance with second pulse width modulation control; and a controller configured to control the first and second voltage converters by generating first and second pulse width modulation control signals, the controller being configured to, when one or both of temperatures of the first and second batteries are lower than a predetermined temperature, change phases of the pulse width modulation control signals such that the first second pulse width modulation control signals change from a synchronous state to an asynchronous state.

5 Claims, 8 Drawing Sheets

POWER SUPPLY SYSTEM

INCORPORATION BY REFERENCE

The disclosure of Japanese Patent Application No. 2014-209057 filed on Oct. 10, 2014 including the specification, drawings and abstract is incorporated herein by reference in its entirety.

BACKGROUND OF THE INVENTION

1. Field of the Invention

The invention relates to a power supply system and, more particularly, to control over a power supply system that includes parallel-connected direct-current power supplies each including a battery and a step-up converter.

2. Description of Related Art

In recent years, the following power supply system is used as a power supply system for an electromotive vehicle. The power supply system includes two parallel-connected direct-current power supplies each including a battery and a step-up converter, and supplies the total output current of the two step-up converters to an inverter. Each step-up converter is to step up the voltage of the corresponding battery through PWM control for turning on or off switching elements, and the output current fluctuates. Therefore, when fluctuations in output currents from the two step-up converters overlap with each other, fluctuations in the output current of the power supply system increase, with the result that a capacitor that smoothes a direct current that is supplied to the inverter may become larger or vibrations and noise may increase. For this reason, there is suggested that fluctuations in output currents of the two step-up converters are cancelled by shifting the phases of carrier waves that are respectively used in PWM controls over the two step-up converters by 180° and, as a result, fluctuations in output current from the power supply system are reduced (see, for example, Japanese Patent Application Publication No. 2008-5625 (JP 2008-5625 A)).

Incidentally, when the temperatures of batteries are low, the charge-discharge characteristics decrease. Therefore, for example, when the electromotive vehicle is started up in a low temperature state, sufficient charge-discharge characteristics need to be ensured by quickly raising the temperatures of the batteries. However, there is an inconvenience that it takes time to raise the temperatures of the batteries by using such current fluctuations that occur in the step-up converters through PWM controls as described in JP 2008-5625 A.

SUMMARY OF THE INVENTION

The invention provides a power supply system that includes parallel-connected direct-current power supplies each including a battery and a step-up converter and that is able to reduce a heat-up time of each battery.

An aspect of the invention relates to a power supply system. The power supply system includes: a first voltage converter configured to bidirectionally convert voltage between a first battery and an output line in accordance with first pulse width modulation control; a second voltage converter connected to the output line in parallel with the first voltage converter, the second voltage converter being configured to bidirectionally convert voltage between a second battery and the output line in accordance with second pulse width modulation control; and a controller configured to control the first and second voltage converters by generating first and second pulse width modulation control signals, the controller being configured to, when one or both of temperatures of the first and second batteries are lower than a predetermined temperature, change phases of the pulse width modulation control signals such that the first pulse width modulation control signal and the second pulse width modulation control signal change from a synchronous state to an asynchronous state. The controller may be configured to, when one or both of the temperatures of the first and second batteries are lower than the predetermined temperature, change the phases of the pulse width modulation control signals such that the first pulse width modulation control signal and the second pulse width modulation control signal periodically alternate between the synchronous state and the asynchronous state.

The controller may be configured to, when the absolute value of a total current of an output current of the first voltage converter and an output current of the second voltage converter is larger than or equal to a predetermined threshold, reduce a change period of the phases of the pulse width modulation control signals as compared to when the absolute value of the total current is smaller than the predetermined threshold.

A change of the phases may be continuous with respect to time.

According to the above aspect of the invention, it is possible to advantageously reduce a heat-up time of each battery in the power supply system that includes the parallel-connected direct-current power supplies each including the battery and the step-up converter.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
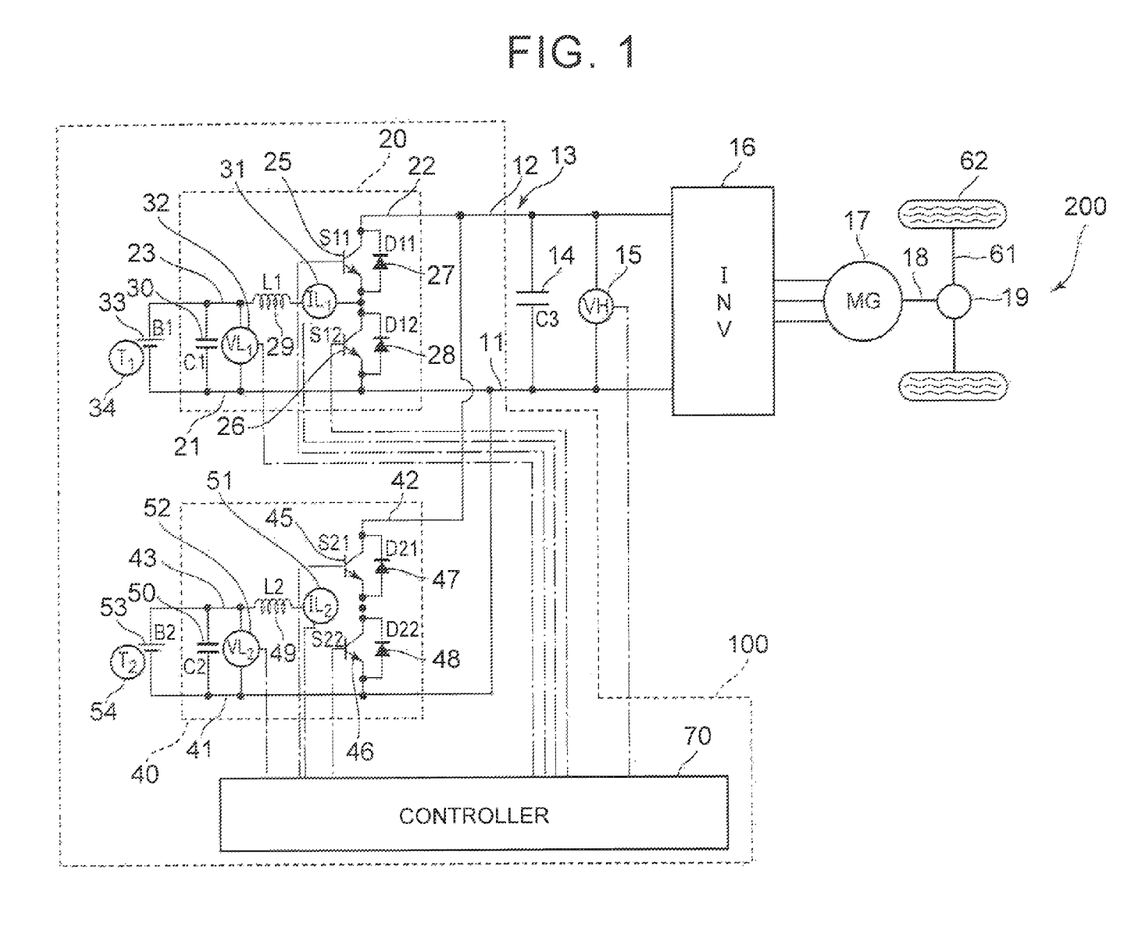
FIG. 1 is a system diagram that shows the configuration of a power supply system according to an embodiment of the invention.

Hereinafter, the case where a power supply system 100 according to an embodiment of the invention is mounted on an electromotive vehicle 200 will be described with reference to the accompanying drawings. The electromotive vehicle 200 is not limited to a vehicle that is driven by a motor or a motor generator. The electromotive vehicle 200 may be a hybrid vehicle that is driven by an engine and a motor generator. As shown in FIG. 1, the power supply system 100 according to the present embodiment includes a first voltage converter 20, a second voltage converter 40 and a controller 70. The first voltage converter 20 bidirectionally converts voltage between a first battery 33 and an output line 13 (as will be described later, the output line 13 includes a high-voltage line 12 and a ground line 11). The second voltage converter 40 is connected to the output line 13 in parallel with the first voltage converter 20, and bidirectionally converts voltage between a second battery 53 and the output line 13. The controller 70 controls the first voltage converter 20 and the second voltage converter 40.

The first voltage converter 20 includes a first ground line 21, a first low-voltage line 23 and a first high-voltage line 22. The first ground line 21 is connected to the minus side of the first battery 33. The first low-voltage line 23 is connected to the plus side of the first battery 33. The first high-voltage line 22 is a plus-side output end of the first voltage converter 20. The first voltage converter 20 includes a first upper arm switching element 25, a first lower arm switching element 26, a first reactor 29, a first reactor current sensor 31, a first filter capacitor 30 and a first low voltage sensor 32. The first upper arm switching element 25 is arranged between the first low-voltage line 23 and the first high-voltage line 22. The first lower arm switching element 26 is arranged between the first ground line 21 and the first low-voltage line 23. The first reactor 29 is arranged in series with the first low-voltage line 23. The first reactor current sensor 31 detects a first reactor current IL1. The first filter capacitor 30 is arranged between the first low-voltage line 23 and the first ground line 21. The first low voltage sensor 32 detects a first low voltage VL1 between both ends of the first filter capacitor 30. Diodes 27, 28 are respectively connected in antiparallel with the switching elements 25, 26. The first upper arm switching element 25 and the first lower arm switching element 26 are connected to the controller 70. Each of the first upper arm switching element 25 and the first lower arm switching element 26 turns on or off in response to a command from the controller 70. The first reactor current sensor 31 and the first low voltage sensor 32 are also connected to the controller 70. Detected signals of the sensors 31, 32 are input to the controller 70.

The second voltage converter 40 to which the second battery 53 is connected has a similar configuration to that of the first voltage converter 20. The second voltage converter 40 includes a second ground line 41, a second low-voltage line 43, a second high-voltage line 42, a second upper arm switching element 45, a second lower arm switching element 46, a second reactor 49, a second reactor current sensor 51, a second filter capacitor 50, a second low voltage sensor 52, and diodes 47, 48. The second reactor current sensor 51 detects a second reactor current IL2. The second low voltage sensor 52 detects a second low voltage VL2 between both ends of the second filter capacitor 50.

The first ground line 21 of the first voltage converter 20 and the second ground line 41 of the second voltage converter 40 are connected to the ground line 11 of the power supply system 100. The first high-voltage line 22 of the first voltage converter 20 and the second high-voltage line 42 of the second voltage converter 40 are connected to the high-voltage line 12 of the power supply system 100. The ground line 11 and the high-voltage line 12 constitute the output line 13 of the power supply system 100. In this way, the first voltage converter 20 and the second voltage converter 40 are connected to the output line 13 in parallel with each other.

As shown in FIG. 1, direct-current power output from the power supply system 100 is converted to alternating-current power by an inverter 16, and the alternating-current power is supplied to a motor generator 17. The output of the motor generator 17 is transmitted from an output shaft 18 to axles 61 via a differential gear 19 and drives wheels 62 of the electromotive vehicle 200. A smoothing capacitor 14 and a high voltage sensor 15 are connected between the power supply system 100 and the inverter 16. The smoothing capacitor 14 smoothes direct-current power output from the power supply system 100. The high voltage sensor 15 detects a high voltage VH of the output line 13. A first battery temperature sensor 34 is installed in the first battery 33. The first battery temperature sensor 34 detects the temperature T1 of the first battery 33. A second battery temperature sensor 54 is installed in the second battery 53. The second battery temperature sensor 54 detects the temperature T2 of the second battery 53. The high voltage sensor 15 and the temperature sensors 34, 54 are connected to the controller 70. Detected signals of the sensors 15, 34, 54 are input to the controller 70.

Figure 2:
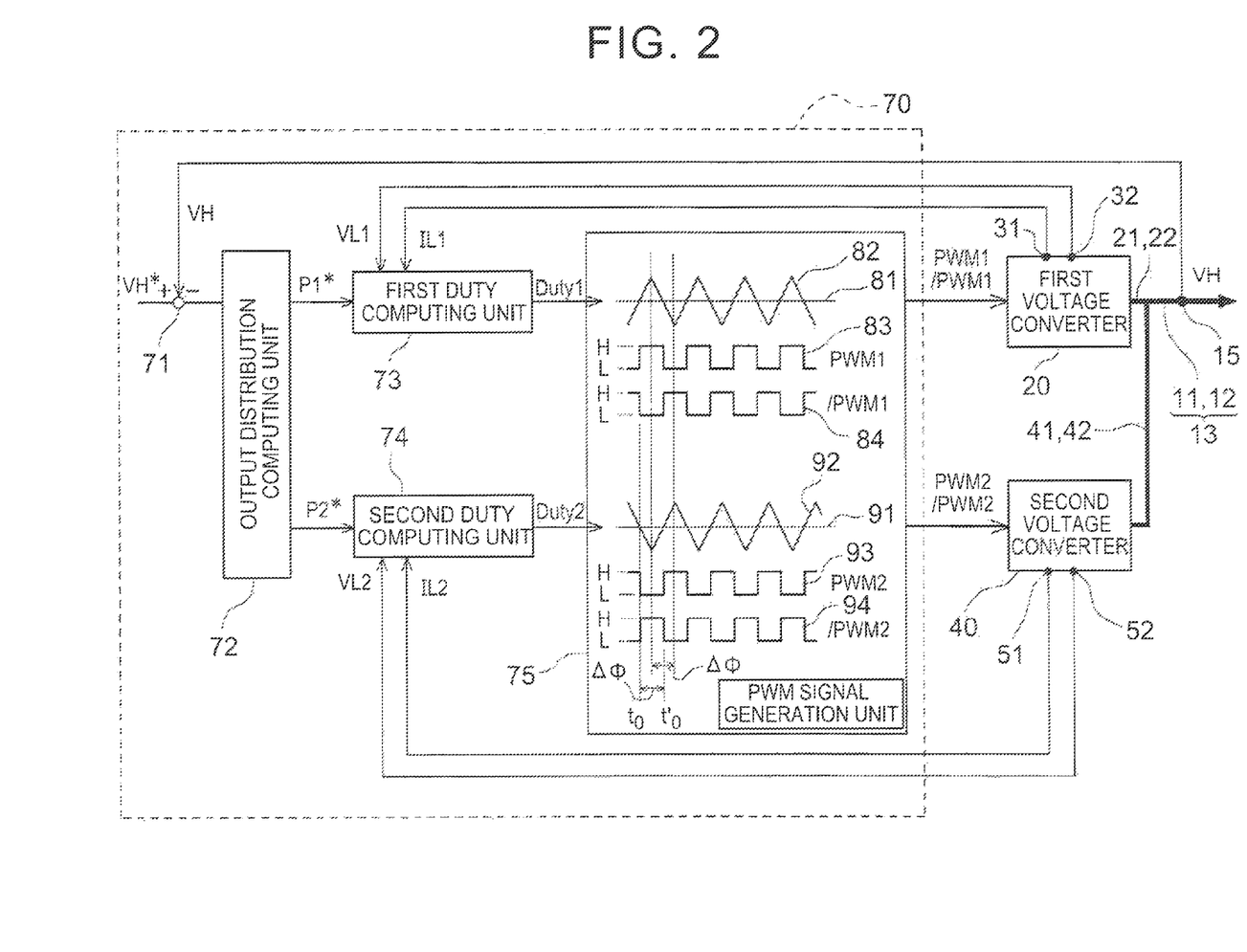
FIG. 2 is a control block diagram of the power supply system according to the embodiment of the invention.

The controller 70 is a computer that includes a CPU and a storage unit inside. As shown in FIG. 2, the controller 70 feeds back the actual high voltage VH detected by the high voltage sensor 15, the first and second reactor currents IL1, IL2 respectively detected by the first and second reactor current sensors 31, 51 and the first and second low voltages VL1, VL2 respectively detected by the first and second low voltage sensors 32, 52, and then generates and outputs a first pulse width modulation signal (PWM1) 83, an inversion signal /PWM1(84) of the PWM1(83), a second pulse width modulation signal (PWM2) 93 and an inversion signal /PWM2(94) of the PWM2(93). The PWM1(83) and the /PWM1(84) are used to turn on or off the first lower and upper arm switching elements 26, 25 of the first voltage converter 20. The PWM2(93) and the /PWM2(94) are used to turn on or off the second lower and upper arm switching elements 46, 45 of the second voltage converter 40.

As shown in FIG. 2, the controller 70 includes a differentiator 71, an output distribution computing unit 72, first and second duty computing units 73, 74 and a PWM signal generation unit 75. The differentiator 71 calculates a difference between a command value VH* of the high voltage VH and the high voltage VH detected by the high voltage sensor 15. The output distribution computing unit 72 receives the difference calculated by the differentiator 71, and outputs an output command value P1* of the first voltage converter 20 and an output command value P2* of the second voltage converter 40. The first duty computing unit 73 receives the output command value P1*, and outputs a first duty value Duty1 of the first voltage converter 20. The second duty computing unit 74 receives the output command value P2*, and outputs a second duty value Duty2 of the second voltage converter 40. The PWM signal generation unit 75 generates the first pulse width modulation signal (PWM1) 83, the inversion signal /PWM1(84) of the PWM1, the second pulse width modulation signal (PWM2) 93 and the inversion signal /PWM2(94) of the PWM2 from first and second carrier waves (triangular waves) 82, 92 and straight lines 81, 91 of comparative voltages that determine the duty values Duty1, Duty2.

The PWM1(83) becomes a high level H when the carrier wave 82 is on the upper side of the straight line 81 of the duty value Duty1, and becomes a low level L when the carrier wave 82 is on the lower side of the straight line 81 of the duty value Duty1. The PWM2(93) becomes a high level H when the carrier wave 92 is on the upper side of the straight line 91 of the duty value Duty2, and becomes a low level L when the carrier wave 92 is on the lower side of the straight line 91 of the duty value Duty2. The /PWM1(84) and the /PWM2(94) are respectively the inversion signals of the PWM1(83) and the PWM2(93). The /PWM1(84) becomes a high level H when the carrier wave 82 is on the lower side of the straight line 81 of the duty value Duty1, and becomes a low level L when the carrier wave 82 is on the upper side of the straight line 81 of the duty value Duty1. The /PWM2(94) becomes a high level 11 when the carrier wave 92 is on the lower side of the straight line 91 of the duty value Duty2, and becomes a low level L when the carrier wave 92 is on the upper side of the straight line 91 of the duty value Duty2. The PWM1(83) is a signal for turning on or off the first lower arm switching element 26 of the first voltage converter 20. The /PWM1(84) is a signal for turning on or off the first upper arm switching element 25 of the first voltage converter 20. The PWM2(93) is a signal for turning on or off the second lower arm switching element 46 of the second voltage converter 40. The /PWM2(94) is a signal for turning on or off the second upper arm switching element 45 of the second voltage converter 40. Each of the signals turns on a corresponding one of the switching elements 25, 26, 45, 46 when the signal is at the high level H, and turns off a corresponding one of the switching elements 25, 26, 45, 46 when the signal is at the low level L.

As shown in FIG. 2, the second carrier wave 92 is shifted in phase by $\Delta\phi$ from the first carrier wave 82, and the PWM2(93) is shifted in phase by $\Delta\phi$ from the PWM1(83). That is, the rising timing t0 of the PWM1(83) from the low level L to the high level H and the rising timing t'0 of the PWM2(93) from the low level L to the high level H are shifted in phase by $\Delta\phi$. FIG. 2 shows the case where the second carrier wave 92 is shifted by 180° (a half period of the duty cycle of each of the PWM (83) and the PWM2(93)) from the first carrier wave 82. In this case, as shown in FIG. 2, the PWM2(93) is also shifted by 180° from the PWM1 (83), and similarly the /PWM2(94) is also shifted by 180° (a half period of the duty cycle) from the /PWM1(84).

Next, the operation of the power supply system 100 according to the present embodiment will be described with reference to FIG. 3 to FIG. 7B. In the following description, the first upper arm switching element 25, the first lower arm switching element 26, the diodes 27, 28, the first reactor 29, the first filter capacitor 30 and the first battery 33 are respectively referred to by a combination of an abbreviation and a sign as S11(25), S12(26), D11(27), D12(28), L1(29), C1(30), B1(33). The second upper arm switching element 45, the second lower arm switching element 46, the diodes 47, 48, the second reactor 49, the second filter capacitor 50 and the second battery 53 are also respectively referred to by a combination of an abbreviation and a sign as S21(45), S22(46), D21(47), D22(48), L2(49), C2(50), B2(53). In the following description of the embodiment, it is assumed that each of the duty ratios of the PWM1(83) and the PWM2(93) is lower than 50%.

Control Sequence

Figure 3:
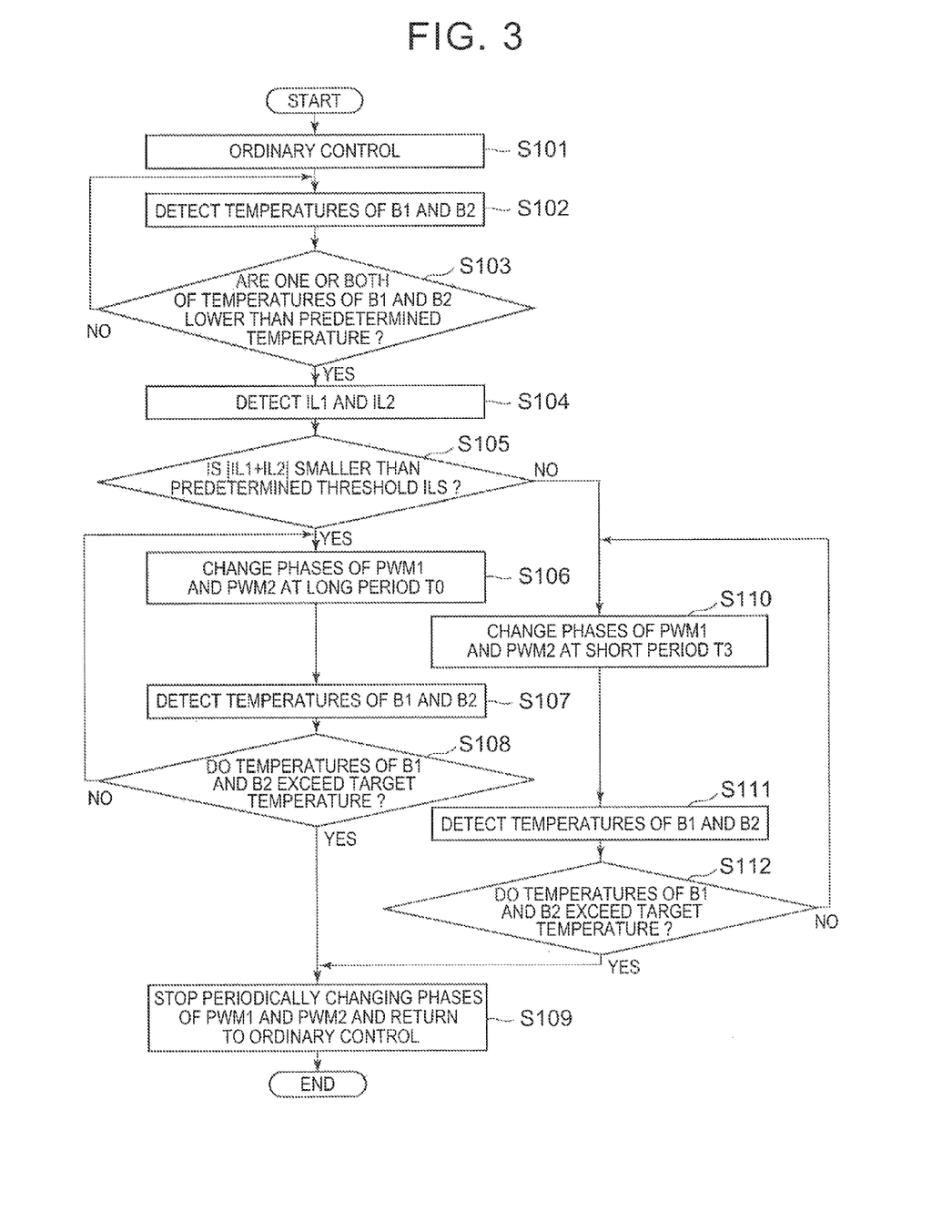
FIG. 3 is a flowchart that shows the operation of the power supply system according to the embodiment of the invention.

In step S101 of FIG. 3, when the controller 70 starts up the power supply system 100, the controller 70 causes the first and second voltage converters 20, 40 to operate in accordance with ordinary control. The ordinary control is to control the first and second voltage converters 20, 40 in a state where the PWM1(83) and the PWM2(93) are fixedly shifted in phase by 180° (a half period of the duty cycle) and the /PWM1 and the /PWM2 are fixedly shifted in phase by 180°. As described with reference to FIG. 2, the ordinary control is to control the first and second voltage converters 20, 40 by shifting the second carrier wave 92 that generates the PWM2(93) by 180° from the first carrier wave 82 that generates the PWM1(83). The details of the ordinary control will be described later.

Subsequently, the controller 70 detects the temperatures T1, T2 of the B1(33) and B2(53) by the first and second battery temperature sensors 34, 54 in step S102 of FIG. 3, and determines in step S103 of FIG. 3 whether one or both of the detected temperatures T1, T2 of the B1(33) and B2(53) are lower than a predetermined temperature, for example, 0° C., −5° C., or the like. When both of the temperatures T1, T2 are higher than or equal to the predetermined temperature (not lower than the predetermined temperature) in step S103 of FIG. 3, the controller 70 returns to step S103 of FIG. 3 and continues monitoring the temperatures T1, T2 of the B1(33) and B2(53). When one or both of the temperatures T1, T2 are lower than the predetermined temperature in step S103 of FIG. 3, the controller 70 proceeds to step S104 of FIG. 3 and starts battery warm-up control (phase period changing control). The battery warm-up control (phase period changing control) is control for changing the phases of the PWM1(83) and PWM2(93) such that the PWM1(83) and the PWM2(93) periodically alternate between a synchronous state and an asynchronous state. The details of the battery warm-up control will be described later.

The controller 70 detects the first reactor current IL1 and the second reactor current IL2 with the use of the first reactor current sensor 31 and the second reactor current sensor 51 in step S104 of FIG. 3, and determines in step S105 of FIG. 3 whether the absolute value (|IL1+IL2|) of the total current of the first reactor current IL1 and the second reactor current IL2 is smaller than a threshold ILS. When the controller 70 determines in step S105 of FIG. 3 that |IL1+IL2| is smaller than the predetermined threshold ILS, the controller 70 proceeds to step S106 of FIG. 3, and warms up the B1(33) and the B2(53) by changing the phases of the PWM1 and PWM2 between the synchronous state and the asynchronous state at a long period T0. The controller 70 detects the temperatures T1, T2 of the B1(33) and B2(53) in step S107 of FIG. 3, and continues the battery warm-up control in step S108 of FIG. 3 until the temperatures T1, T2 of the B1(33) and B2(53) reach a target warm-up temperature, for example, 10° C. or 20° C. When the controller 70 determines in step S108 of FIG. 3 that the temperatures of the B1(33) and B2(53) exceed the target warm-up temperature, the controller 70 proceeds to step S109 of FIG. 3, stops the battery warm-up control and returns to the ordinary control.

When the controller 70 determines in step S105 of FIG. 3 that |IL1+IL2| is larger than or equal to the predetermined threshold ILS (not smaller than ILS), the controller 70 proceeds to step S110 of FIG. 3, and warms up the B1(33) and the B2(53) by changing the phases of the PWM1 and PWM2 between the synchronous state and the asynchronous state at a short period T3. When the temperatures T1, T2 of the B1(33) and B2(53) exceed the target warm-up temperature in step S111 and step S112 in FIG. 3, the controller 70 proceeds to step S109 of FIG. 3, stops the battery warm-up control and returns to the ordinary control.

Ordinary Control (180° Fixed Phase Control)

Hereinafter, the ordinary control (180° fixed phase control) will be described in detail. When the PWM1(83) and the PWM2(93) are shifted in phase by 180°, that is, a half period of the duty cycle, the rising timing t0 of the PWM1(83) from the low level L to the high level H and the rising timing t'0 of the PWM2(93) from the low level L to the high level H are shifted in phase by 180° (a half period of the duty cycle) as shown in FIG. 2. Therefore, when each of the duty ratios of the PWM1(83) and PWM2(93) is lower than 50%, the PWM2(93) is at the low level L during the period in which the PWM1(83) is at the high level H; whereas the PWM2(93) is at the high level H during the period in which the PWM1(83) is at the low level L.

Figure 5A:
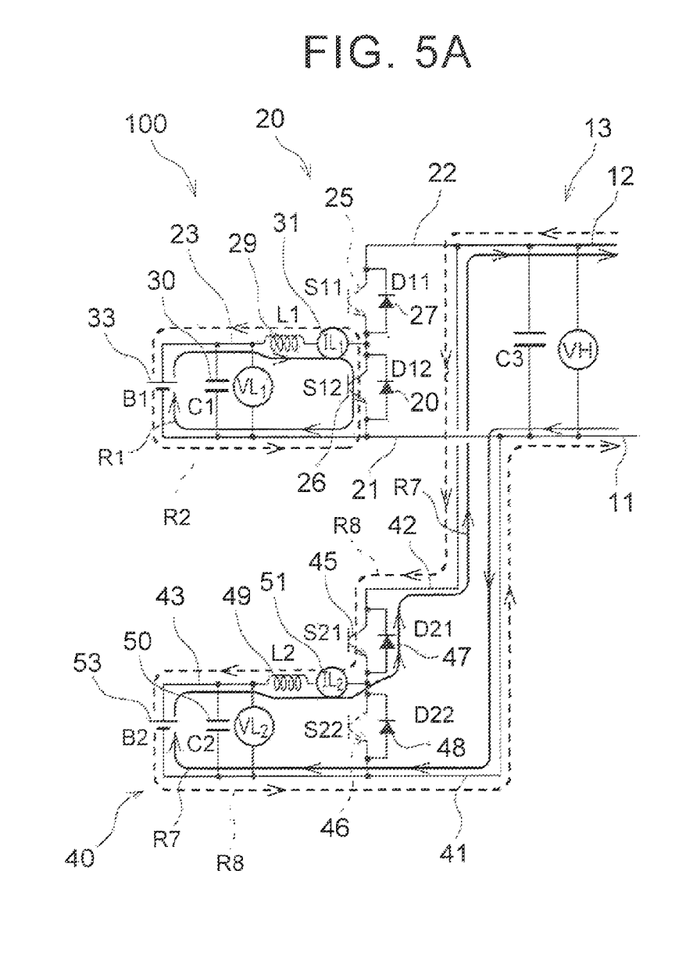
FIG. 5A and FIG. 5B are diagrams that show the flow of currents in the case where the power supply system according to the embodiment of the invention is operated while the phase of the first pulse width modulation control signal and the phase of the second pulse width modulation control signal are shifted by 180°.
Figure 5B:
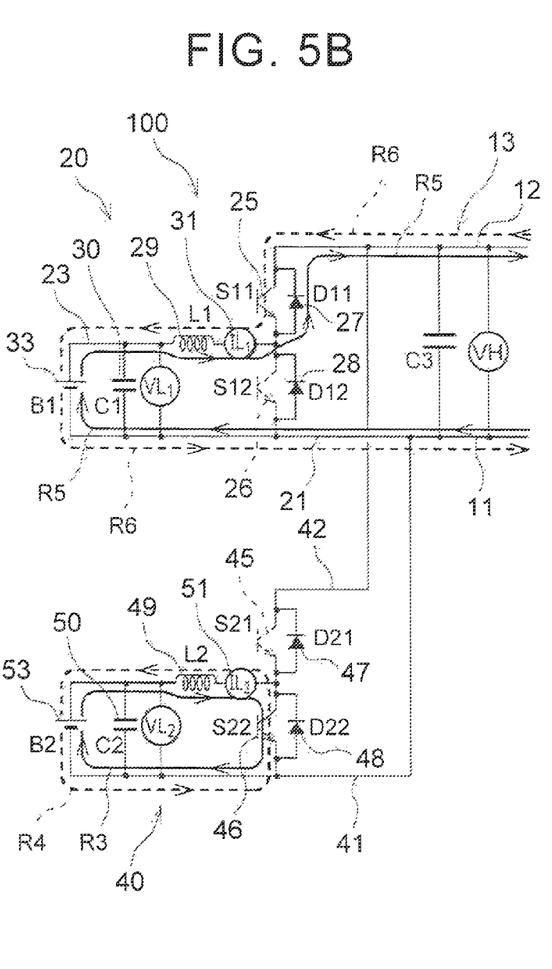

The operations of the switching elements 25, 26, 45, 46 and the flow of currents in the case where the above-described control is executed will be described with reference to FIG. 5A and FIG. 5B. FIG. 5A shows the case where the PWM1(83) is at the high level H (the /PWM1(84) is at the low level L) and the PWM2(93) is at the low level L (the /PWM2(94) is at the high level H). In this case, the S12(26) that is turned on or off by the PWM1(83) becomes the on state, and the S11(25) that is turned on or off by the /PWM1(84) becomes the off state. The S22(46) that is turned on or off by the PWM2(93) becomes the off state, and the S21(45) that is turned on or off by the /PWM2(94) becomes the on state.

As shown in FIG. 5A, in the first voltage converter 20, the S12(26) is in the on state and the S11(25) is in the off state, so, in the case of step-up operation, a circuit R1 (indicated by the continuous line) through which current flows in order of the B1(33), the L1(29), the S12(26) and the B1(33) is established, and the electric power of the B1(33) is charged into the L1(29). In the second voltage converter 40, a circuit R7 (indicated by the continuous line) through which current flows in order of the L2(49), the D21(47), the high-voltage line 12, the ground line 11, the B2(53) and the L2(49) is established, and electric energy charged in the L2(49) is stepped up to the high voltage VH and is output to the output line 13. In the case of regeneration of electric power, in the first voltage converter 20, a circuit R2 (indicated by the broken line, and a circuit having a similar path to that of the circuit R1) through which current flows in the reverse direction in order of the L1(29), the B1(33), the S12(26) and the L1(29), and the B1(33) is charged with electric energy accumulated in the L1(29). In the second voltage converter 40, a circuit R8 (indicated by the broken line) through which current flows in order of the high-voltage line 12, the S21(45), the L2(49), the B2(53), the ground line 11 and the high-voltage line 12 is established, and the high voltage VH of the output line 13 is stepped down and is charged into the B2(53).

As the duty cycle elapses a half period from the state shown in FIG. 5A, the PWM1(83), the /PWM1(93), the PWM2(84) and the /PWM2(94) are inverted, and the circuits established in the first voltage converter 20 and the circuits established in the second voltage converter 40 are inverted. As shown in FIG. 5B, the S11(25) turns on, the S12(26) turns off, the S21(45) turns off, and the S22(46) turns on. As shown in FIG. 5B, in the second voltage converter 40, in the case of step-up operation, a circuit R3 (indicated by the continuous line) through which current flows in order of the B2(53), the L2(49), the S22(46) and the B2(53) is established, and the electric power of the B2(53) is charged into the L2(49). In the first voltage converter 20, a circuit R5 (indicated by the continuous line) through which current flows in order of the L1(29), the D11(27), the high-voltage line 12, the ground line 11, the B1(33) and the L1(29) is established, and the electric energy charged in the L1(29) is stepped up to the high voltage VH and is output to the output line 13. In the case of regeneration of electric power, in the second voltage converter 40, a circuit R4 (indicated by the broken line, and a circuit having a similar path to that of the circuit R3) through which current flows in order of the 12(49), the B2(53), the S22(46) and the L2(49) is established, and the B2(53) is charged with electric energy accumulated in the L2(49). In the first voltage converter 20, a circuit R6 (indicated by the broken line) through which current flows in order of the high-voltage line 12, the S11(25), the L1(29), the B1(33), the ground line 11 and the high-voltage line 12 is established, and the high voltage VH of the output line 13 is stepped down and is charged into the B1(33).

As described above, in the ordinary control, the power supply system 100 outputs stepped-up electric power alternately from the first voltage converter 20 or the second voltage converter 40 to the output line 13. In this case, like time 0 to time t6 in FIG. 4, the change curve of the first reactor current IL1 of the first voltage converter 20 and the change curve of the second reactor current IL2 of the second voltage converter 40 are inverted from each other, and the peaks of one of the change curves coincide with the valleys of the other one of the change curves. Therefore, the total current (IL1+IL2) of the first reactor current IL1 and second reactor current IL2, which will be a current that is output to the output line 13, does not change much, and the high voltage VH also does not change much. As described with reference to FIG. 2 above, the controller 70 controls the voltage converters 20, 40 by feeding back the actual high voltage VH detected by the high voltage sensor 15. Therefore, as fluctuations in the actual high voltage VH are small, the difference between a command value VH* of the high voltage and the actual high voltage VH becomes smaller, so it is possible to execute stable control. Therefore, the actual high voltage VH is controlled to a substantially constant voltage.

Synchronization of PWM1 and PWM2 in Battery Warm-Up Control (Phase Period Changing Control)

Next, the battery warm-up control will be described. As described above, the battery warm-up control is control for changing the phases of the PWM1(83) and PWM2(93) such that the two pulse width modulation control signals PWM1(83), PWM2(93) periodically alternate between the synchronous state and the asynchronous state. The synchronous state means the case where the two signals are not shifted in phase ($\Delta\phi=0$), and the asynchronous state means the case where the two signals are shifted in phase and, for example, the case where the two signals are shifted in phase by 180° ($\Delta\phi=180°$) as in the case of the ordinary control. In the following description, the case where $\Delta\phi$ is periodically changed within the range of zero to 180° will be described.

The operation in the case where the two pulse width modulation control signals are shifted in phase by 180° is similar to that of the above-described ordinary control, so the description thereof is omitted, the operation in the case where the phase difference Δϕ between the two pulse width modulation control signals PWM1(83), PWM2(93) is zero and the two signals are synchronized with each other will be described.

Figure 6:
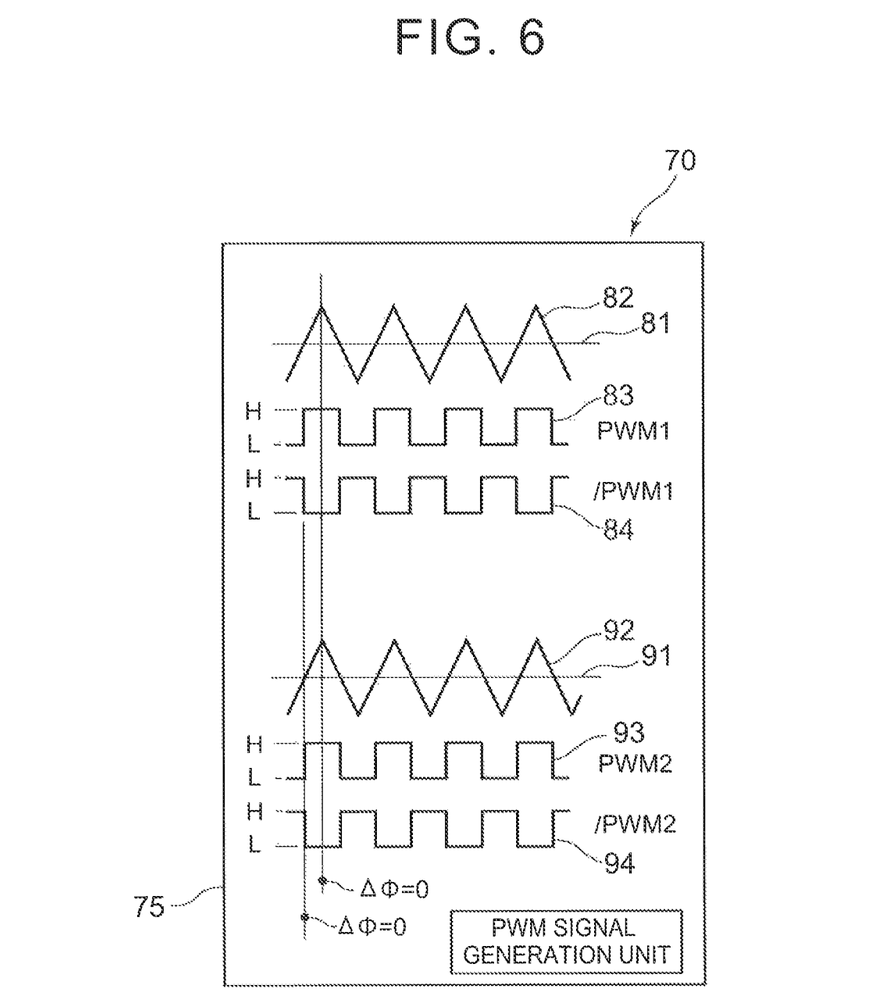
FIG. 6 is a diagram that shows a PWM signal generation unit that generates the first pulse width modulation control signal and the second pulse width modulation control signal, which are synchronized with each other, in the power supply system according to the embodiment of the invention.

As shown in FIG. 6, the controller 70 executes the process of the PWM signal generation unit 75 such that the first carrier wave 82 for generating the PWM1(83) is synchronized with the second carrier wave 92 for generating the PWM2(93) and the phase difference Δϕ between the carrier waves 82, 92 becomes zero. Thus, the duty cycles of the two pulse width modulation control signals are synchronized with each other, and the synchronized PWM1(83) and PWM2(93) are generated. In this case, as shown in FIG. 6, the rising timing of the PWM1(83) from the low level L to the high level H and the rising timing of the PWM2(93) from the low level L to the high level H synchronize with each other, so the PWM1(83) and the PWM2(93) change from the low level L to the high level H at the same time.

Figure 7A:
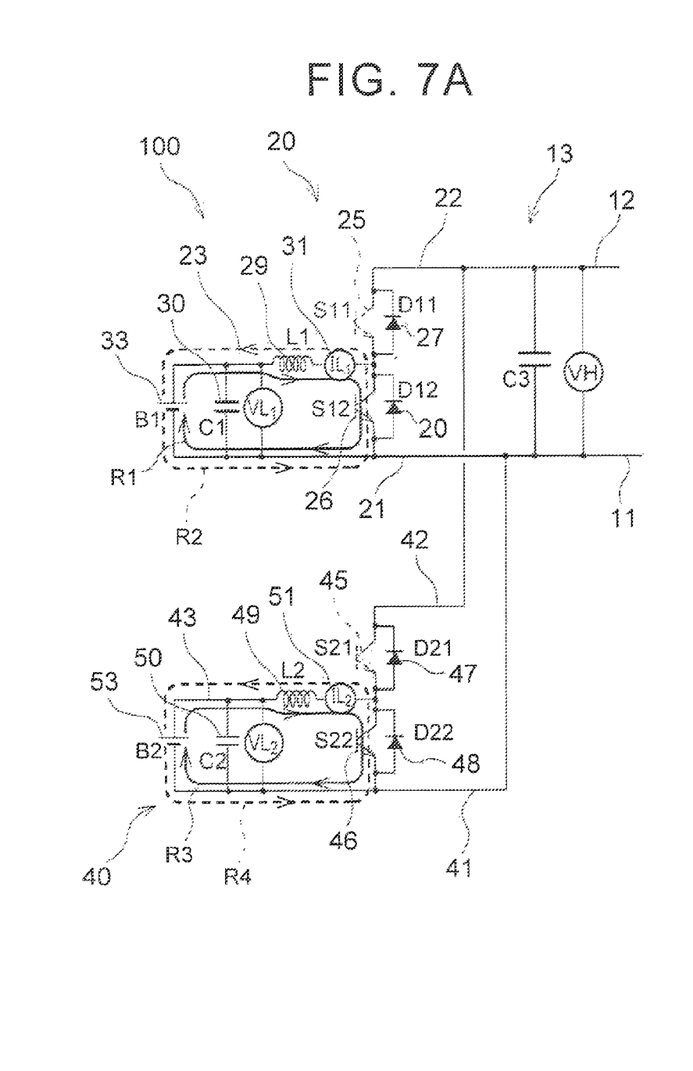
FIG. 7A and FIG. 7B are diagrams that show the flow of currents in the case where the power supply system according to the embodiment of the invention is operated while the first pulse width modulation control signal and the second pulse width modulation control signal are synchronized with each other.
Figure 7B:
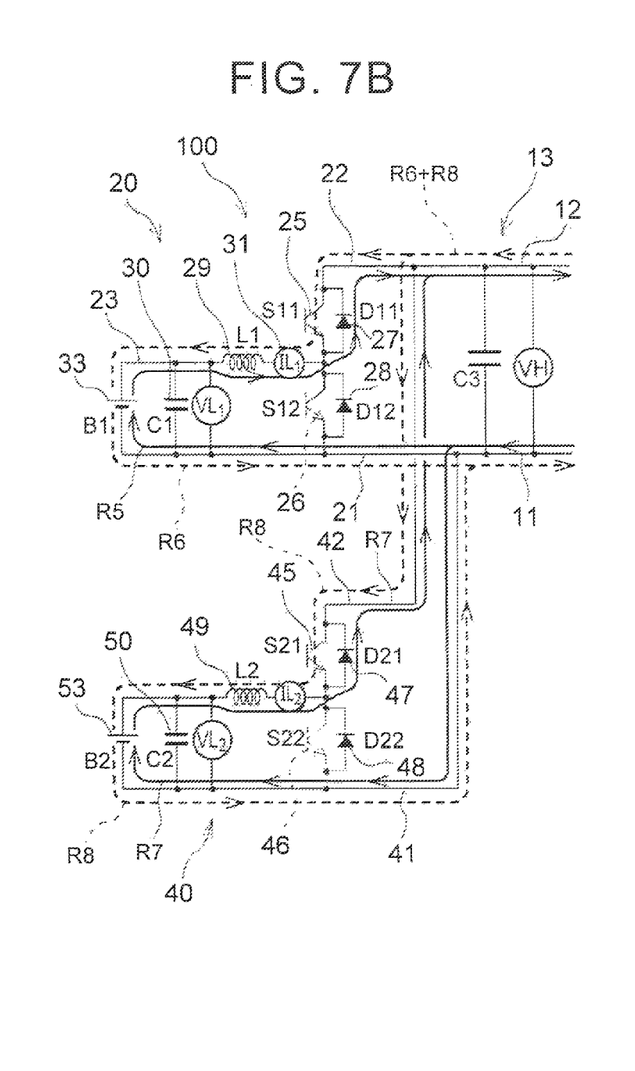

The operations of the switching elements 25, 26, 45, 46 and the flow of currents in the case where the above-described control is executed will be described with reference to FIG. 7A and FIG. 7B. FIG. 7A shows the case where both the PWM1(83) and the PWM2(93) are at the high level H (both the /PWM1(84) and the /PWM2(94) are at the low level L). FIG. 7B shows the case where both the PWM1(83) and the PWM2(93) are at the low level L (both the /PWM1(84) and the /PWM2(94) are at the high level H). The operation of the first voltage converter 20 in the state shown in FIG. 7A is similar to the operation described with reference to FIG. 5A. The operation of the second voltage converter 40 is similar to the operation described with reference to FIG. 5B. The first voltage converter 20 charges electric power to the L1(29) with the use of the B1(33), and the second voltage converter 40 charges electric power to the L2(49) with the use of the B2(53). The operation of the first voltage converter 20 in the state shown in FIG. 7B is similar to the operation described with reference to FIG. 5B. The operation of the second voltage converter 40 is similar to the operation described with reference to FIG. 5A. The first voltage converter 20 steps up electric power charged in the L1(29) to the high voltage VH and outputs the high voltage VH to the output line 13. The second voltage converter 40 steps up electric power charged in the L2(49) to the high voltage VH and outputs the high voltage VH to the output line 13. In this way, when the PWM1(83) and the PWM2(93) are synchronized with each other, the first and second voltage converters 20, 40 charge the corresponding reactors at the same time, and output electric powers at the same time. Therefore, as shown from time t20 to time t26 in FIG. 4, fluctuations in the first reactor current IL1 of the first voltage converter 20 and fluctuations in the second reactor current IL2 of the second voltage converter 40 synchronize with each other. Thus, the total current (IL1+IL2) of the first reactor current IL1 and the second reactor current IL2, which is a current that is output to the output line 13, significantly changes, and the high voltage VH also significantly changes.

As described with reference to FIG. 2 above, the controller 70 controls the voltage converters 20, 40 by feeding back the actual high voltage VH detected by the high voltage sensor 15. Control constants for feedback control, PI control or PID control inside the output distribution computing unit 72 and the first and second duty computing units 73, 74 in the controller 70 are determined such that optimal responsiveness is exercised in the case of the ordinary control (the PWM1(83) and the PWM2(93) are shifted in phase by 180°) in which a change in the above-described actual high voltage VH is small. Therefore, when the actual high voltage VH significantly fluctuates as a result of synchronization of the PWM1(83) with the PWM2(93), control becomes instable and divergent. Therefore, each of the first reactor current IL1 and the second reactor current IL2 performs self-excited oscillation, and its amplitude increases with a lapse of time. On the other hand, when the first and second reactor currents IL1, IL2 significantly oscillate in this way, output currents of the B1(33) and B2(53) also significantly oscillate, so a rise in the temperatures of the B1(33) and B2(53) becomes earlier.

Figure 4:
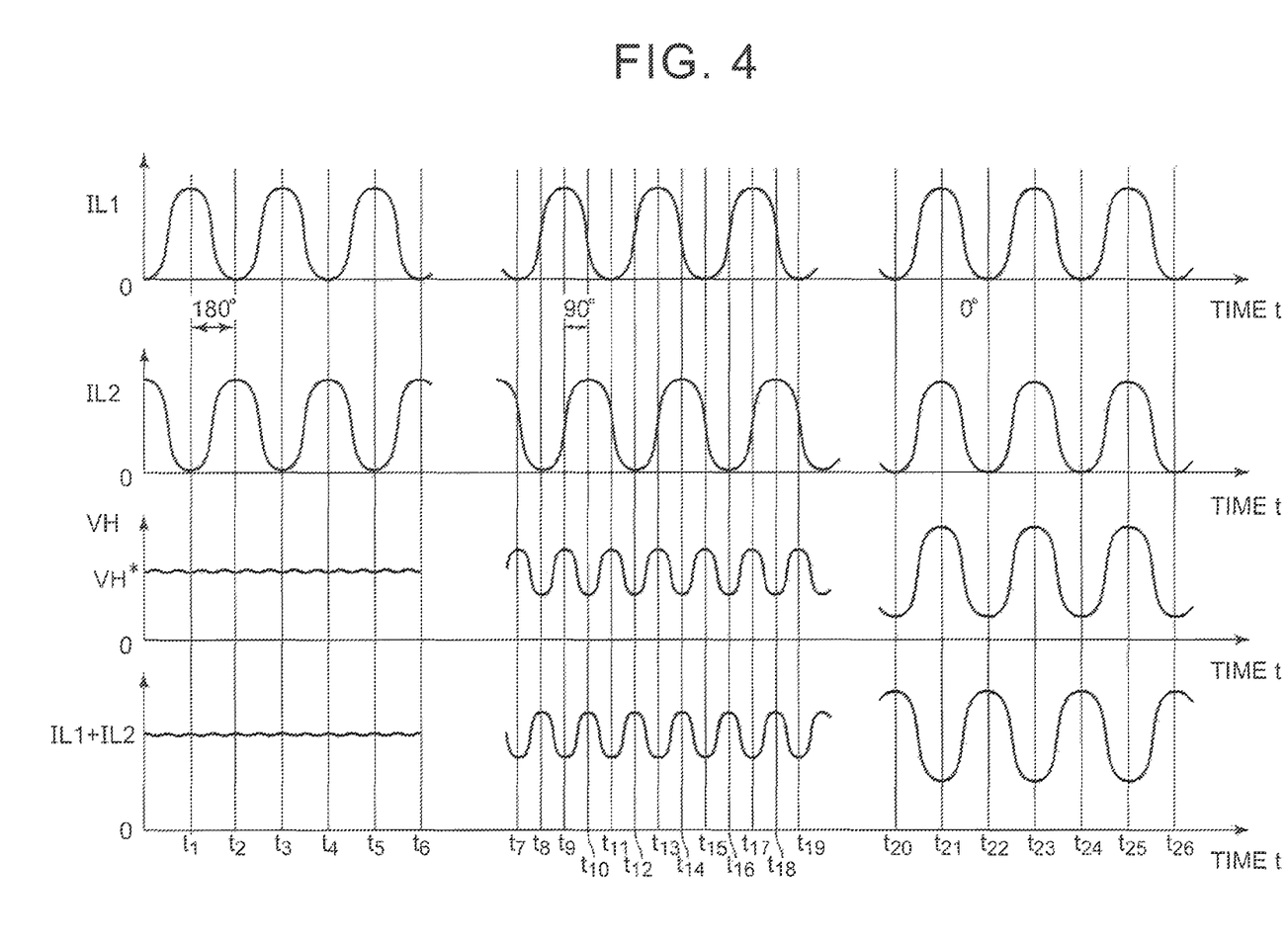
FIG. 4 is a timing chart that shows temporal changes in reactor currents IL1, IL2 of voltage converters, a high voltage VH of an output line and a total current (IL1+IL2) of the reactor currents IL1, IL2 of the voltage converters in the case where the phase of a first pulse width modulation control signal and the phase of a second pulse width modulation control signal are shifted by 180° or 90° or the pulse width modulation control signals are synchronized with each other in the power supply system according to the embodiment of the invention.

As shown from time t7 to time t19 in FIG. 4, when the phase difference Δϕ between the two pulse width modulation control signals PWM1(83), PWM2(93) is 90° that is intermediate between zero and 180°, the actual high voltage VH fluctuates; however, the width of the fluctuations is smaller than that in the case where the PWM1(83) and the PWM2(93) are synchronized with each other.

As described above, control becomes stable when the PWM (83) and the PWM2(93) are shifted in phase by 180°, the first and second reactor currents IL1, IL2 just fluctuate as a result of turning on or off the switching elements 25, 26, 45, 46, and the temperatures of the batteries 33, 53 gradually rise. On the other hand, control becomes instable when the PWM1(83) and the PWM2(93) are synchronized with each other (the phase difference Δϕ is zero), the first and second reactor currents IL1, IL2 oscillate by a large amount because of self-excited oscillation, and the amplitudes increase with time. Therefore, the temperatures of the batteries 33, 53 rapidly rise. Control becomes instable when a shift between the phases of the PWM1(83) and PWM2(93) is intermediate (for example, 90°) between 180° and zero, the first and second reactor currents IL1, IL2 oscillate; however, the amplitudes are not so large as those in the case where the PWM1(83) and the PWM2(93) synchronize with each other. Therefore, a rise in the temperatures of the batteries 33, 53 is intermediate between the case where the signals are synchronized in phase and the case where the signals are shifted in phase by 180°.

Figure 8:
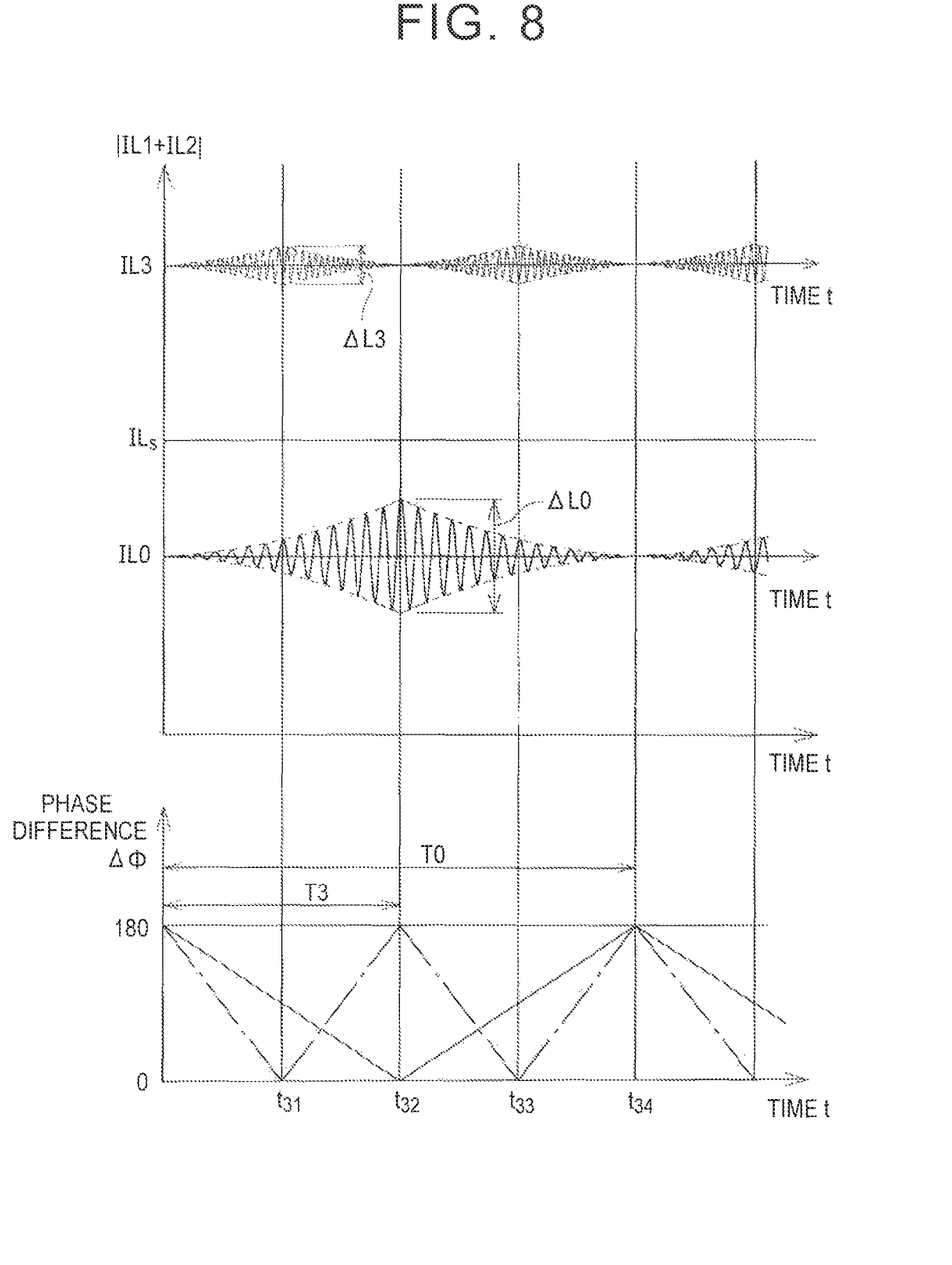
FIG. 8 is a graph that shows changes in the phase of the first pulse width modulation control signal, changes in the phase of the second pulse width modulation control signal and changes in the absolute value (|IL1+IL2|) of the total current of the reactor currents IL1, IL2 of the voltage converters in the power supply system according to the embodiment of the invention.

As shown at the bottom of FIG. 8, the controller 70 periodically changes the shift between the phases of the PWM1(83) and PWM2(93) in order of 180° (asynchronous), zero (synchronous) and 180° (asynchronous). Thus, control over the power supply system 100 periodically changes in order of stable (phase asynchronous), instable (phase synchronous) and stable (phase asynchronous), and the rate of rise in the temperatures of the batteries changes in order of ordinary (asynchronous), rapid (synchronous) and ordinary (asynchronous). The period of a phase change is determined on the basis of a time that takes until current oscillation increases to an allowable current of each element at the time when control becomes instable. That is, the temperatures of the batteries 33, 53 are rapidly raised by making control instable through synchronization of the phases of the PWM1 (83) and PWM2(93) with each other to generate current oscillations, and, when the magnitude of current oscillation has increased to a value near the allowable current of each element, control is oriented toward a stable state by making the phases of the PWM1(83) and PWM2(93) asynchronous to prevent a complete breakdown of control. When control becomes stable and the current oscillation disappears, current oscillation is generated by making control instable again, thus rapidly raising the temperatures of the batteries 33, 53. When the total current (the absolute value of the total current |IL1+IL2|) of the first and second reactor currents IL1, IL2 is large, that is, when the output electric power or regenerated electric power of the power supply system 100 is large, the allowable current of each element is reached within a time shorter than that in the case where the output electric power or the regenerated electric power is small. Therefore, in the present embodiment, when the total current (the absolute value |L1+IL2| of the total current) of the first and second reactor currents IL1, IL2 is larger than or equal to the predetermined threshold ILS, the period of a phase change is controlled so as to be shorter than the period of a phase change in the case where the total current (the absolute value of the total current) of the first and second reactor currents IL1, IL2 is smaller than the predetermined threshold ILS.

As shown at the top and middle of FIG. 8, when the total current (|IL1+IL2|, the absolute value of the total current) of the first and second reactor currents IL1, IL2 is IL0 that is smaller than the predetermined threshold ILS, the controller 70 controls the power supply system 100 in a state where the phase difference Δϕ between the PWM1(83) and the PWM2 (93) is 180° at time 0. Therefore, at time 0, |IL1+IL2| is stable at IL0. As shown at the bottom of FIG. 8, the controller 70 changes the phase difference Δϕ between the PWM1(83) and the PWM2(93) from 180° (the PWM1(83) and the PWM2(93) are in the asynchronous state) to zero (the PWM1(83) and the PWM2(93) are in the synchronous state) from time 0 to time t32. As described above, control over the power supply system 100 becomes instable, and |IL1+IL2| starts to oscillate as shown at the top and middle of FIG. 8. The oscillation increases with a lapse of time or as the phase difference is brought close to zero. In this way, when |IL1+IL2| oscillates, current oscillation larger than current fluctuations resulting from turning on or off the switching elements in PWM controls also occur in the first and second reactor currents IL1, IL2, with the result that the output current or regenerated current of each of the batteries 33, 53 also significantly oscillates. The temperatures of the batteries 33, 53 are rapidly raised by the current fluctuations.

As shown at the top and middle of FIG. 8, the amplitude of the oscillation of |IL1+IL2| gradually increased from time 0 reaches ΔL0 at time t32. Currents respectively flowing through the switching elements 25, 26, 45, 46 and the diodes 27, 28, 47, 48 are obtained by adding a current generated by oscillation to the corresponding currents in the case where |IL1+IL2| is IL0, and an instantaneous current flowing through each element is close to the allowable current of the element at time t32. The controller 70 expands the phase difference Δϕ between the PWM1(83) and the PWM2(93) from zero to 180° from time t32 toward time t34. Thus, as shown at the top and middle of FIG. 8, the oscillation of |IL1+IL2| begins to reduce. The oscillation reduces with a lapse of time or as the phase difference is increased toward 180°. When the phase difference Δϕ between the PWM1(83) and the PWM2(93) reaches 180° at time t34, control over the power supply system 100 returns to a stable state, the oscillation of |IL1+IL2| disappears, and |IL1+IL2| is constant at IL0. The controller 70 reduces the phase difference Δϕ between the PWM1(83) and the PWM2(93) from 180° toward zero again from time t34, and gradually increases the oscillation of |IL1+IL2|. In this way, the controller 70 changes the phases of the PWM1(83) and PWM2(93) between 180° (asynchronous) and zero (synchronous) with the period set to a time T0 from time 0 to time t34. Thus, current is oscillated by periodically making control instable, and the temperatures of the batteries 33, 53 are periodically rapidly raised by the current oscillation.

As shown at the top and middle of FIG. 8, when the total current (|IL1+IL2|, the absolute value of the total current) of the first and second reactor currents IL1, IL2 is IL3 larger than or equal to the predetermined threshold ILS, the controller 70 changes the phase difference Δϕ between the PWM1(83) and the PWM2(93) within the range between 180° and zero at a period set to a time T3 (between time 0 and time t32) shorter than the time T0 in the case where the total current (|IL1+IL2|, the absolute value of the total current) of the first and second reactor currents IL1, IL2 is smaller than the predetermined threshold ILS. In this way, when the phase difference Δϕ between the PWM1(83) and the PWM2(93) is changed at a short period, control is stabilized before the amplitude increases so much because of an instable control state as shown at the top and middle of FIG. 8, so the amplitude of |IL1+IL2| becomes ΔL3 smaller than ΔL0 described above. In this case, currents respectively flowing through the switching elements 25, 26, 45, 46 and the diodes 27, 28, 47, 48 are the total currents of the currents corresponding to the case where |IL1+IL2| is IL3 larger than IL0 and ΔL3 of which the amplitude of current is smaller than ΔL0, so an instantaneous current flowing through each element at time t31 is suppressed to near the allowable current of the corresponding element as in the case described above. However, in this case, the amplitude ΔL3 of current oscillation is smaller than the amplitude ΔL0 in the above-described case, so a rise in the temperatures of the batteries 33, 53 is not so fast as the above-described case.

As described above, the power supply system 100 according to the present embodiment oscillates current by periodically making control instable by periodically changing the phase difference between the PWM1(83) and the PWM2(93) between 180° (asynchronous) and zero (synchronous), and rapidly raises the temperatures of the batteries 33, 53 by the period current oscillation, thus making it possible to reduce a warm-up time of the batteries 33, 53. In the present embodiment, the power supply system 100 executes control such that the phases of the two signals are changed at the long period T0 in the case where the absolute value |IL1+IL2| of the total current of the first and second reactor currents IL1, IL2 is smaller than the threshold ILS and the phases of the two signals are changed at the short period T3 in the case where |IL1+IL2| is larger than or equal to the threshold ILS. Therefore, even when current oscillation is generated through instable control, it is possible to reduce the warm-up time of the batteries 33, 53 while an instantaneous current flowing through each element does not exceed the allowable current of the corresponding element.

In the above-described embodiment, the phase difference Δϕ between the two signals is continuously changed between 180° and zero in proportion to time; however, the manner of changing the phase difference Δϕ is not limited to this configuration. For example, the phase difference Δϕ may be changed from 180° to zero at time 0, kept at zero from time 0 to time t32, returned from zero to 180° at time t32 and kept at 180° from time t32 to time t34. In the present embodiment, the change period of the phase difference Δϕ is set to the long period T0 in the case where |IL1+IL2| is smaller than the threshold ILS, and the change period of the phase difference Δϕ is set to the short period 13 in the case where |IL1+IL2| is larger than or equal to the threshold ILS; however, the manner of setting the change period of the phase difference Δϕ is not limited to this configuration. For example, the change period of the phase difference Δϕ may be set to a reference period in the case where |IL1+IL2| is the threshold ILS, and the change period may be set so as to be shorter than the reference period in response to (for example, in proportion to) a degree to which |IL1+IL2| exceeds the threshold ILS in the case where |IL1+IL2| exceeds the threshold ILS; whereas the change period may be set so as to be longer than the reference period in response to (for example, in proportion to) a degree to which |IL1+IL2| is smaller than the threshold ILS in the case where |IL1+IL2| is smaller than the threshold ILS.

What is claimed is:

1. A power supply system comprising:
   a first voltage converter configured to bidirectionally convert voltage between a first battery and an output line in accordance with first pulse width modulation control;
   a second voltage converter connected to the output line in parallel with the first voltage converter, the second voltage converter being configured to bidirectionally convert voltage between a second battery and the output line in accordance with second pulse width modulation control; and
   a controller configured to control the first and second voltage converters by generating first and second pulse width modulation control signals, the controller being configured to, when one or both of temperatures of the first and second batteries are lower than a predetermined temperature, change phases of the pulse width modulation control signals such that the first pulse width modulation control signal and the second pulse width modulation control signal change from an asynchronous state to a synchronous state, wherein
   the controller is configured to, when one or both of the temperatures of the first and second batteries are lower than the predetermined temperature, change the phases of the pulse width modulation control signals such that the first pulse width modulation control signal and the second pulse width modulation control signal alternate or periodically alternate between the synchronous state and the asynchronous state, and
   the controller is configured to, when the absolute value of a total current of an output current of the first voltage converter and an output current of the second voltage converter is larger than or equal to a predetermined threshold, reduce a change period of the phases of the pulse width modulation control signals as compared to when the absolute value of the total current is smaller than the predetermined threshold.

2. The power supply system according to claim 1, wherein a change of the phases is continuous with respect to time.

3. A power supply system comprising:
   a first voltage converter configured to bidirectionally convert voltage between a first battery and an output line in accordance with first pulse width modulation control;
   a second voltage converter connected to the output line in parallel with the first voltage converter, the second voltage converter being configured to bidirectionally convert voltage between a second battery and the output line in accordance with second pulse width modulation control; and
   a controller configured to control the first and second voltage converters by generating first and second pulse width modulation control signals, the controller being configured to, when one or both of temperatures of the first and second batteries are lower than a predetermined temperature, change phases of the pulse width modulation control signals such that the first pulse width modulation control signal and the second pulse width modulation control signal change from an asynchronous state to a synchronous state, wherein
   temperatures of the batteries rapidly rise as the pulse width modulation control signals are shifted from the asynchronous state to the synchronous state so as to decrease phase difference, and
   the controller is configured to change the phases of the pulse width modulation control signals such that the pulse width modulation control signals alternate or periodically alternate between the synchronous state in which the phase difference is zero and the asynchronous state in which the phase difference is 180 degrees or 90 degrees.

4. The power supply system according to claim 3, wherein a change of the phases is continuous with respect to time.

5. The power supply system according to claim 3, wherein the controller is configured to, when one or both of the temperatures of the first and second batteries are lower than the predetermined temperature, change the phases of the pulse width modulation control signals such that the first pulse width modulation control signal and the second pulse width modulation control signal alternate or periodically alternate between the synchronous state and the asynchronous state.

* * * * *

UNITED STATES PATENT AND TRADEMARK OFFICE
CERTIFICATE OF CORRECTION

| | |
|---|---|
| PATENT NO. | : 9,669,718 B2 |
| APPLICATION NO. | : 14/875798 |
| DATED | : June 6, 2017 |
| INVENTOR(S) | : Shohei Oi and Ryoji Sato |

It is certified that error appears in the above-identified patent and that said Letters Patent is hereby corrected as shown below:

On the Title Page

In items (12) and (72), please correct the inventors name as follows:
Change "Ol" to --OI--.

Signed and Sealed this
Twentieth Day of February, 2018

Andrei Iancu
*Director of the United States Patent and Trademark Office*